(12) United States Patent  
Vertenten

(10) Patent No.: US 10,366,039 B2  
(45) Date of Patent: Jul. 30, 2019

(54) USB LINK BRIDGE

(71) Applicant: NXP B.V., Eindhoven (NL)

(72) Inventor: Bart Vertenten, Merelbeke (BE)

(73) Assignee: NXP B.V., Eindhoven (NL)

( * ) Notice: Subject to any disclaimer, the term of this patent is extended or adjusted under 35 U.S.C. 154(b) by 55 days.

(21) Appl. No.: 15/487,260

(22) Filed: Apr. 13, 2017

(65) Prior Publication Data

US 2018/0300282 A1    Oct. 18, 2018

(51) Int. Cl.
| | |
|---|---|
| G06F 13/42 | (2006.01) |
| G06F 13/40 | (2006.01) |
| G06F 5/06 | (2006.01) |
| G06F 13/16 | (2006.01) |
| G06F 13/38 | (2006.01) |

(52) U.S. Cl.
CPC ......... G06F 13/4282 (2013.01); G06F 5/065 (2013.01); G06F 13/1673 (2013.01); G06F 13/385 (2013.01); G06F 13/4059 (2013.01); G06F 2205/067 (2013.01); G06F 2213/0042 (2013.01)

(58) Field of Classification Search
None
See application file for complete search history.

(56) References Cited

U.S. PATENT DOCUMENTS 6,389,029 B1 * 5/2002 McAlear .................. H04L 12/46 370/402
8,553,753 B2  10/2013 Hsieh et al.
(Continued)

FOREIGN PATENT DOCUMENTS

WO    2007/067191 A2    6/2007
WO    2015/199877 A1    12/2015

OTHER PUBLICATIONS

Shettigara, R. "Bit Level Retimer (BLR)", MegaChips, 20 pgs. (May 18, 2016).

(Continued)

*Primary Examiner* — Ilwoo Park

(57) ABSTRACT

A universal serial bus (USB) link bridge device is disclosed. The USB link bridge device includes a host side module configured to be interfaced with a USB host. The host side module includes a receiver and is configured to receive serial data from the USB host, convert the received serial data into parallel data and store the parallel data into an elasticity buffer. A data controller coupled to the host side module is also included. The USB link bridge device further includes a device side module coupled to the data controller and includes a transmitter. The device side module is configured to receive parallel data from the data controller and convert the received parallel data into serial data and to transmit the serial data towards a USB device. The data controller includes a first-in-first-out (FIFO) memory and a bridge state machine, the data controller is configured to receive the parallel data from the host side module, return an acknowledge signal back to the host side module, store the parallel data in the FIFO memory and transmit the parallel data from the FIFO memory based on a configuration of the bridge state machine. The bridge state machine is configured to decide when to send the parallel data from the FIFO memory toward the USB device.

9 Claims, 3 Drawing Sheets

(56) References Cited

U.S. PATENT DOCUMENTS

| | | | |
|---|---|---|---|
| 8,719,475 B2 | 5/2014 | Ma et al. | |
| 9,626,517 B2 | 4/2017 | Obukhov | |
| 2004/0095929 A1 | 5/2004 | Aoshima | |
| 2004/0177197 A1* | 9/2004 | McLeod | G06F 13/4045 |
| | | | 710/300 |
| 2007/0245059 A1* | 10/2007 | Tjia | G06F 13/4027 |
| | | | 710/313 |
| 2011/0051934 A1* | 3/2011 | Ikeda | H04L 7/0029 |
| | | | 380/287 |
| 2012/0084469 A1* | 4/2012 | Tang | G06F 13/385 |
| | | | 710/53 |
| 2012/0317446 A1 | 12/2012 | Jaramillo | |
| 2013/0132625 A1 | 5/2013 | Hall | |
| 2014/0122752 A1* | 5/2014 | Toivanen | H04L 69/22 |
| | | | 710/63 |
| 2014/0149628 A1 | 5/2014 | Lin | |
| 2017/0017604 A1 | 1/2017 | Chen et al. | |
| 2017/0371831 A1* | 12/2017 | Das Sharma | G06F 13/4068 |
| 2018/0293198 A1 | 10/2018 | Vertenten | |
| 2019/0068397 A1 | 2/2019 | Chen | |

OTHER PUBLICATIONS

Universal Serial Bus 3.0 Specification Chapter 3-11, 400 pgs., retrieved from the Internet Oct. 20, 2011 at http://www.usb.org (Nov. 12, 2018).

Usb-If: "Universal Serial Bus 3.1 Specification, Revision 1.0 Chapter 6—Physical Layer", 57 pgs., retrieved from the Internet Jun. 21, 2018 at: http://www.usb.org (Jul. 26, 2013).

Usb-If: "Universal Serial Bus 3.1 Specification, Revision 1.0—Appendix E—Repeaters", 20 pgs., retrieved from the Internet Jun. 21, 2018 at: http://www.usb.org (Oct. 31, 2014).

Usb-If: "USB-IF Compliance Updates", 4pgs, retrieved from the Internet Jun. 21, 2018 at: http://compliance.usb.org/index.asp?UpdateFile=USB3&Format=Standard (Jan. 31, 2017).

* cited by examiner

USB LINK BRIDGE

The Universal Serial Bus (USB) protocol enables electronics communications in accordance with the USB standards. The USB standards define signal properties, timing, and state changes required for compatibility with the protocol. Data is transferred between one or more USB ports according to the USB standards. Depending upon the length of a cable between the USB ports, a signal transferring data between the USB ports may deteriorate while traveling from one port to another. To increase data rates, the cable length of passive USB cables is being reduced. The USB2.0 solutions are typically capable at transferring 480 Mb/s over a 5-meter passive cable. The USB3.0 solutions are typically capable of transferring 5 Gb/s over a 3-meter passive cable and the USB3.1 solutions typically transfer data at 10 Gb/s over a 1-meter passive cable.

A one-meter cable is not convenient for many users and/or applications. To enable longer cables, the USB3.1 specifications defines a USB repeater. Repeater refers to any active component that acts on a signal in order to increase the physical lengths and/or interconnect loss over which the signal can be transmitted successfully. The category of repeaters includes both retimers and re-drivers. Retimer refers to a component that contains a clock-data recovery (CDR) circuit that "retimes" the signal. The retimer latches the signal into a synchronous memory element before retransmitting it. It is used to extend the physical length of the system without accumulating high frequency jitter by creating separate clock domains on either side of the retimer.

SRIS (Separate Reference clock Independent SSC) retimer refers to a retimer implementation that has its transmit clock derived from a local reference clock and is independent of the recovered clock at its receiver. Bit-level retimer refers to a retimer implementation that has its transmit clock derived from the recovered clock at its receiver, except during part of link training.

Redriver refers to an analog component that operates on the signal without re-timing it. This may include equalization, amplification, and transmitter. The redriver does not include a CDR.

A retimer reconditions data signals to increase data communication distance. A redriver is a system that regenerates signals to boost the signal quality in high-speed data links. Using equalization, pre-emphasis, and other technologies. According to the USB specifications, a maximum of four USB repeaters can be added to a link between a USB host and device. That is, one on the USB host board, one on the USB device board and two in the active cable (one on each end). However, this solution is not convenient as it requires additions at the host and the device side ports.

Adding USB re-timers in a communication link between an USB3.x host and an UXB3.x device, adds latency when data is transferred between the host and the device. This additional latency increases the link layer turn-around delay at the USB3.x host and USB3.x device side. The USB3.x link layer specification defines time-out counters to check that data has arrived at a receiving link partner. If a sending link partner receives no response within a specified amount of time, the sending link partner will make an assumption that there is an issue with the communication link between the sending link partner and the receiving link partner and starts retraining the link therebetween.

For USB3.1, USB active cables are available that contain USB repeaters with a data path latency (at the link layer) of approximately 300 ns and more. When these active cables are used to connect certain USB3.0 legacy devices, the link layer data path latency introduced by these active cables is too large and the link layer timer that checks turn-around times typically times-out, preventing the USB3.0 devices to exchange data using the active cables designed based on USB3.1 specifications.

The USB3.x retimer with error correction and the USB3.x SRIS retimer require an elasticity buffer to compensate for the different frequencies of incoming and out-going data carrier. Having an elasticity buffer further increases the latency. It has been shown that currently available repeater architectures cannot meet the maximum data path latency of 50 nanoseconds under all conditions.

The components with the minimal data path latency are USB redrivers. USB redrivers are analog components that enhance the data signal on the line without retiming the bits. This may include equalization, amplification and transmitter. It does not include a CDR. The problem with USB redrivers is that they do not remove jitter from the incoming signal. It is assumed that when four USB redrivers are in a data path, the data signal at the end of these four redrivers is likely to have degraded to the extent that the data cannot be recovered by the USB host/device.

A USB3.x bit-level retimer can meet the data path latency requirement (at the link layer) of maximum 50 nanoseconds but imposes other challenges such as switching between local clock and recovered clock and fast wake-up from a low power mode.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a universal serial bus (USB) link bridge device is disclosed. The USB link bridge device includes a host side module configured to be interfaced with a USB host. The host side module includes a receiver and is configured to receive serial data from the USB host, convert the received serial data into parallel data and store the parallel data into an elasticity buffer. The USB link bridge device also includes a data controller coupled to the host side module and a device side module coupled to the data controller and includes a transmitter. The device side module is configured to receive parallel data from the data controller and convert the received parallel data into serial data and to transmit the serial data towards a USB device. The data controller includes a first-in-first-out (FIFO) memory and a bridge state machine module, the data controller is configured to receive the parallel data from the host side module, return an acknowledge signal back to the host side module, store the parallel data in the FIFO memory and transmit the parallel data from the FIFO memory based on a configuration of the bridge state machine module. The bridge state machine module is configured to decide when to send the parallel data from the FIFO memory toward the USB device.

In another embodiment, a method for enhancing physical connection distance between a Universal Serial Bus (USB) host and a USB device using a USB link bridge is disclosed. The method includes receiving, by the USB link bridge, a packet from the USB host, storing the packet in a first-in-first-out (FIFO) memory, sending, by the USB link bridge, an acknowledgement to the USB host and transmitting, by the USB link bridge, the packet to the USB device. The method further includes receiving, by the USB link bridge, a signal from the USB device, wherein if the signal indicates unsuccessful transmission of the packet, resending the packet and if the signal indicates a successful transmission, removing the packet from the FIFO and notifying the USB host that another packet can be transmitted from the USB host.

In some embodiments, the data controller is configured to generate USB link commands. The data controller includes a link training status state machine (LTSSM) to detect data transmission, polling and synchronization of data transmission. The LTSSM is separate from the bridge state machine and both function independent to each other. In some embodiments, the LTSSM and the bridge state machine may collaborate with each other. The bridge state machine module is configured to acknowledge receiving a data packet when buffer space is available in the FIFO memory for storing the received data packet.

The bridge state machine module is configured to send LBAD message to the USB host upon receiving a data packet when no buffer space is available in the FIFO memory for storing the received data packet. The bridge state machine module is configured to remove a packet from the parallel data stored in the FIFO memory after sending the packet to the USB device and upon receiving an acknowledgement from the USB device. The bridge state machine module is configured retransmit the packet to the USB device upon receiving LBAD message from the USB device.

In some embodiments, the bridge state machine module is configured to notify, after receiving a message from the USB device that the USB device is ready to receive more data, the USB host that buffer space is available for more packets. The data controller is configured to generate link training patterns that are compliant to the USB standards.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Some wells known components may have been omitted so as not to obfuscate the disclosure.

DETAILED DESCRIPTION

Figure 1:
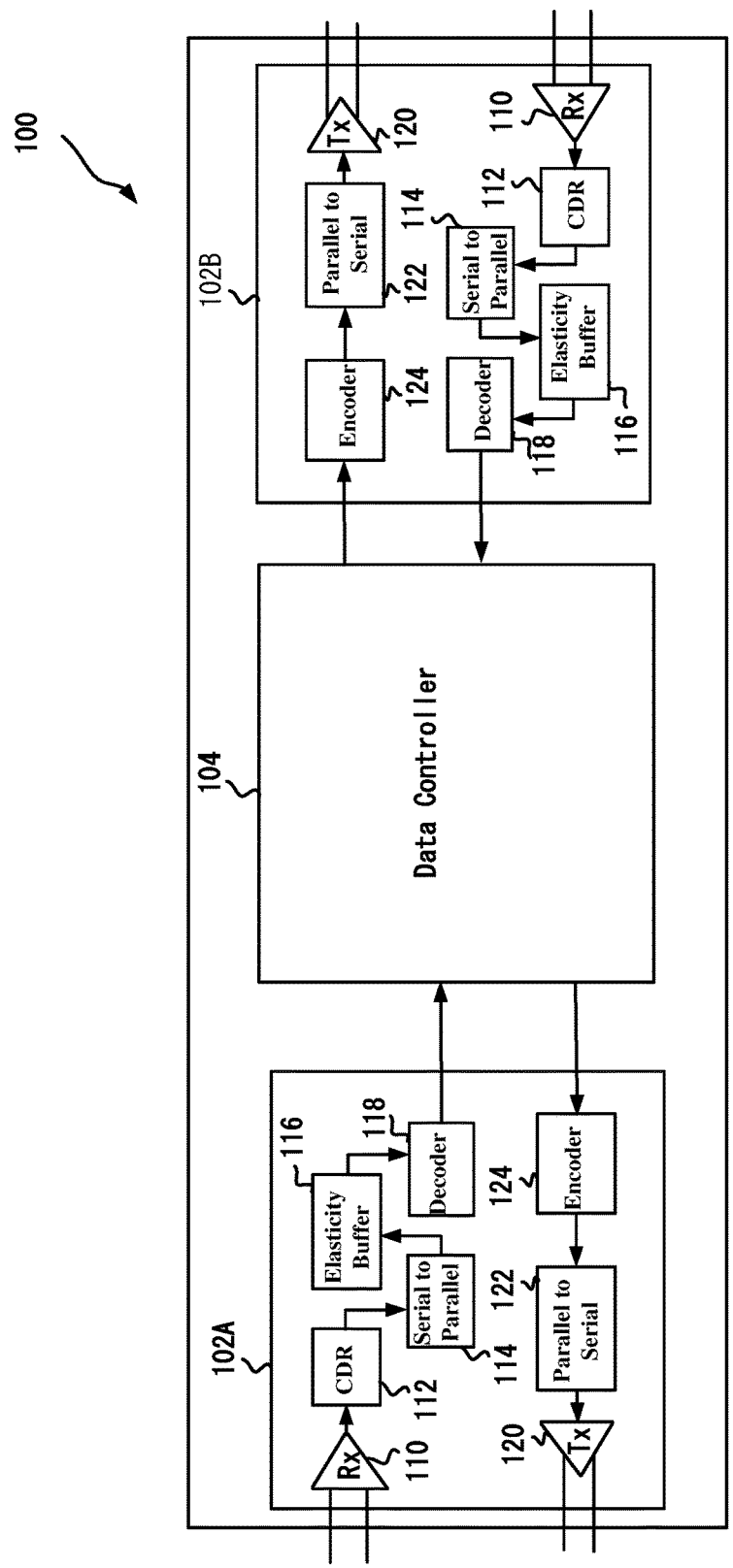
FIG. 1 depicts a schematic of a link bridge in accordance with one or more embodiments of the present disclosure.

FIG. 1 depicts a schematic of a USB3.1 link bridge 100. The USB3.1 link bridge 100 described herein allows extending the cable length while remaining compliant to the USB3.1 specification and maintaining interoperability with existing USB3.0 and USB3.1 devices. The embodiments described herein overcome the shortcomings of retimers and redrivers defined by the USB3.1 specification. The USB3.1 specification can be downloaded from the Internet link http://www.usb.org/developers/docs/. The USB3.1 specification including appendix E is being incorporated herein by reference.

The USB3.1 link bridge 100 implements the physical layer and link layer as defined by the USB3.1 specification. Further, the USB3.1 link bridge 100 is fully transparent for the protocol layer. To be more specific, the USB3.1 link bridge implements a separate Link Training and Status State Machine (LTSSM) for its upstream and downstream port. This means that the USB3.1 link bridge 100 locally trains each port and locally generates all required training and compliance patterns. No changes at the host and the device side are required. In fact, the host and the USB device coupled to the host through one or more (in series, if there are more than one USB3.1 link bridges 100 in between the host and the USB device) USB3.1 link bridges 100 remain unaware of the presence of the USB3.1 link bridge 100 in the connecting cable connecting the host and the USB device. It should be noted that the embodiments of the USB3.1 link bridge 100 may also be suitable for the USB specifications lower than version 3.1.

The USB3.1 link bridge 100 implements link management and flow control features to ensure reliable transfer of data between link partners. In other words, the USB3.1 link bridge 100 locally generates signals defined by the USB3.1 specification as for example, LGOOD_n, LRTY, LBAD, LCRD_x, LCRD1_x and LCRD2_x link commands. Further, the USB3.1 link bridge 100 monitors and forwards other link commands as well as Transaction Packets (TP), Data Packets (DP), Link Management Packets (LMP), Isochronous Time Stamps (ITP). The USB3.1 link bridge 100 may also include a local HP Pending Timer and a Credit HP Timer to detect the absence of link commands returned by the link partner. By having local timers and the local link management and flow control, the data path latency at the link layer is not increased and the USB3.1 link bridge 100 can work with all existing USB3.0 and USB3.1 solutions. The USB3.1 link bridge 100 reconstruct the data packets to be sent onward to the destination of the transmitted data. If the reconstruction of the received packets is successful, the USB3.1 link bridge 100 send an acknowledge signal back to the data sending device.

The USB3.1 link bridge 100 includes a host side module 102A and a device side module 102B. In one or more embodiments, the host side module 102A and the device side module 102B may be structurally identical. Therefore, for the sake of ease, only one of them is being described herein. It should be noted that the USB3.1 link bridge 100 may be fabricated in a same integrated circuit (IC) and the IC may be incorporated in a USB cable. More than one USB3.1 link bridges may be incorporated in a USB cable to extend the length of the USB cable.

According to the USB3.1 specifications, when data is sent from the host to the device (or vice versa) over a USB cable, the device sends an acknowledgement back. If no acknowledgement is received within a predefined time period, the host repeats the data transmission. If the length of the USB cable increases, the acknowledgement may not reach the host within the prescribed time. The USB3.1 link bridge 100 remedies this occurrence, thereby enabling increasing the length of the USB cable without sacrificing the data transmission rate to a significant level, if any.

The host side module 102A includes a receiver 110 configured to receive data from a receiver wire of the USB cable. The received data is inputted to a clock data recovery (CDR) module 112. The high-speed serial data streams received from a USB host at the receiver 110 may not include an accompanying clock signal. The CDR module 112 generates a clock from an approximate frequency reference, and then phase-aligns the clock to the transitions in the received data stream with a phase-locked loop (PLL). The received data stream is then converted into parallel digital data using a serial-to-parallel converter 114. The converted data is then stored in an elasticity buffer 116 (a synchronous memory element) primary for clock synchronization reasons, because the incoming data may be being received at different clock rates. The data stored in the elasticity buffer 116 is decoded using a decoder 118 before further transmitting the data to a data controller 104. The data controller 104 sends an acknowledgement signal back to the host using the transmission path that includes an encoder 124, a parallel to serial converter 122 and a transmitter 120. Since this acknowledgement must be received by the host within a prescribed time, the USB3.1 link bridge 100 must be incorporated in a USB cable at a physical location that does not cause the acknowledgement to be delayed in transmission beyond the predefined time interval specified for the acknowledgement in the USB3.1 specifications. The decoder 118 and the encoder 124 may implement encoding scheme called 128 b/132 b or 8 b/10 b or both. In a previous USB specification, the symbol encoding was using 8 b/10 b mechanism, and that meant that every symbol was represented by 10 bits. The USB3.1 encoding has 128 bits that are represented by 132 bits on the transmission line.

In above paragraphs, a transmission from a host (e.g., a computer) is used for example only. The same method is applicable for the data transmission received from a USB device (e.g., a phone, a camera, a headphone, etc.) and destined for the host. As stated above, the device side module 102B may be identical in structure and functioning to the host side module 102A.

The data controller 104, after further processing, transmits the data received from the elasticity buffer 116 to the USB device through the encoder 124, a parallel to serial converter 122 and a transmitter 120 in the device side module 102B. The data controller 104 waits for an acknowledgement from the USB device within the time specified in the USB3.1 specification. If no acknowledge is received within the predefined time, the data packets for which no acknowledgement was received are resent from the USB3.1 link bridge 100 to the USB device. In this scenario, the host that originally sent the data remains agnostic to communication errors, if any, between the USB3.1 link bridge 100 and the USB device. Once again, the examples illustrate that the host is sending data to the USB device that are connected through a USB cable that incorporates the USB3.1 link bridge. The mechanism of handling transmission of data from the USB device to the host is identical, hence, not being repeated.

Figure 2:
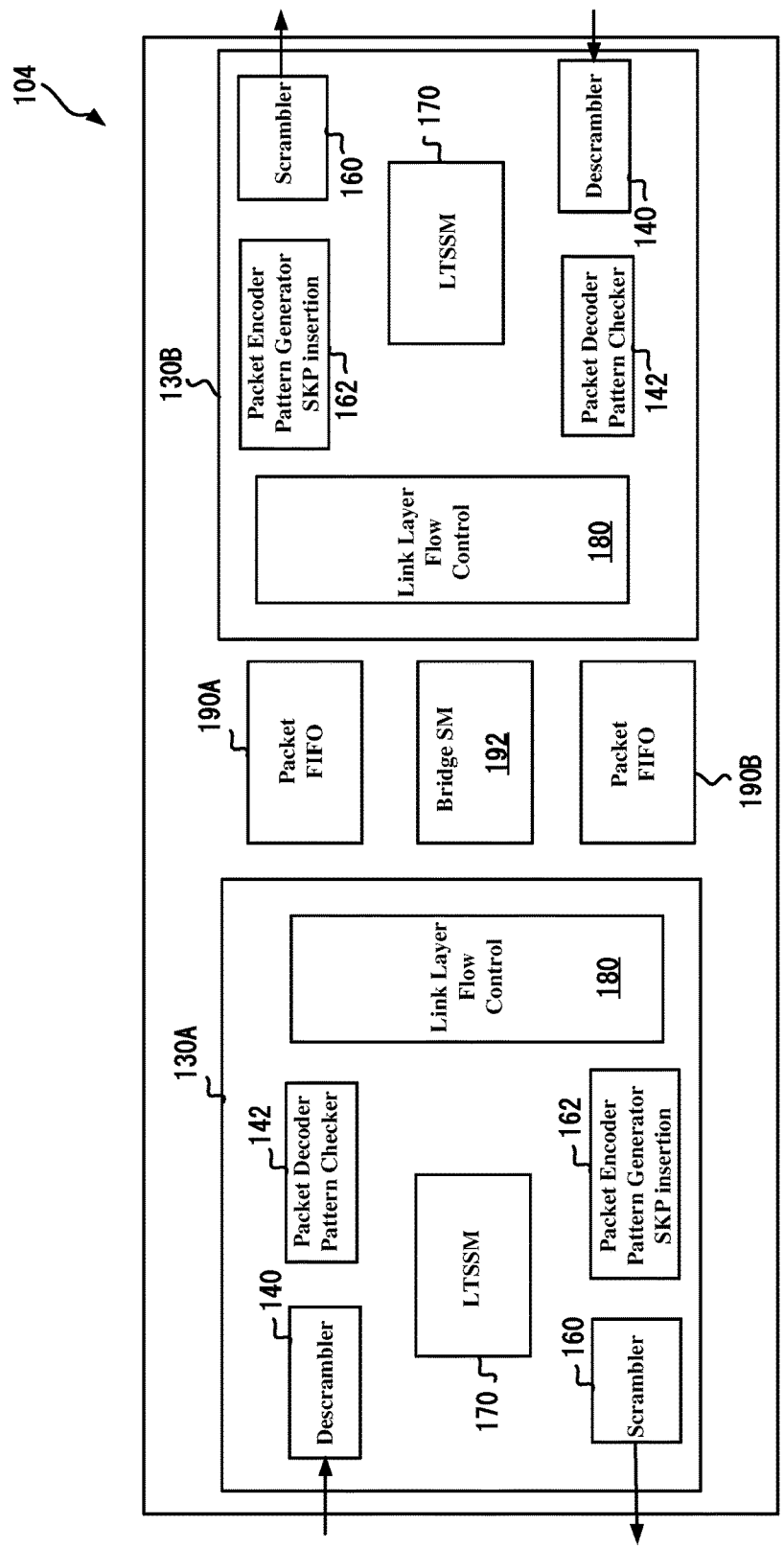
FIG. 2 illustrates a data controller incorporated in the link bridge of FIG. 1 in accordance with one or more embodiments of the present disclosure.

FIG. 2 illustrates internal schematic of the data controller 104. The data controller 104 includes a host side controller 130A and a device side controller 130B which may be identical in functioning and internal structure. Therefore, the description of the host side controller 130A is applicable to the device side controller 130B. The host side controller 130A includes a descrambler 140. Data sent from the host to the USB device (or vice versa) is scrambled or encrypted. The descrambler 140 restore the incoming data packets to their unscrambled state. The descrambled data is inputted to a packet decoder/pattern checker 142. It should be noted that in some embodiments, components of a host side module 130A may be incorporated in the host side controller 130A, as for example, the decoder 118 may be incorporated in the host side controller 130A.

USB 3.1 uses two block types: a control block with the header set to '1100', and a data block with the header set to '0011'. A 1-bit-error situation is self-correctable and does not go to recovery. However, if 2 bits flip, the transmission goes to into recovery. The packet structure starts with the data packet header. The data packet header has two different encodings, depending on whether it's a deferred or non-deferred packet. The packet decoder/pattern checker 142 verifies if a received packet conforms with the packet structure specified in the USB3.1 specification.

The host side controller 130A also include a link training status state machine (LTSSM) 170. The USB 3.0/3.1 architecture utilizes an efficient and productive algorithm for maintaining reliable link, optimized power consumption and fast and error free data transfer between two link partners, e.g., between a USB host and a USB hub/device, or between a USB host/hub and a USB device, or between a USB host/hub and a USB3.1 link bridge 100, or between a USB3.1 link bridge 100 and a USB hub/device, or between two USB3.1 link bridges 100. The LTSSM 170 is employed to achieve the above stated goals. The LTSSM 170 tunes and trains the USB link for reliable data transfer. The LTSSM 170 also implements various algorithms for link's reliability maintenance and is also responsible to recover the link from any errors as may arise. The LTSSM 170 also plays a role in power management by greatly reducing the USB link's power consumption and nullifying any conditions that waste power. The LTSSM 170 may also perform operations for making the link ready for data transaction in the very beginning when the USB upstream port is plugged in to the USB downstream port through a USB cable. The LTSSM 170 helps ensure a reliable data communication. At protocol layer the USB transactions consist of 3 packets: token, data, and handshake. A transaction is initiated with the token packet and this is typically from the host. Data packets deliver the payload data and can be sourced by the host or device. Handshake packets acknowledge the error-free receipt of data and are sent by the receiver of data. In the case of SuperSpeed, however, to save bandwidth the token is incorporated into the data packet for OUT transactions. The token is replaced by the handshake for IN transactions; i.e., an ACK packet acknowledges the previous data packet that has been sent and requests the next data packet.

In the newer USB standards, protocol layer packets are routed to the specific device with the help of the route string in the packet header. The USB device is not polled for the readiness. If a USB device responds with "NRDY" (Not Ready) to an IN Transaction Packet (TP) from the host, then the host stops talking to that device until the device sends the "ERDY" (ready) packet saying that now it is ready to transmit the data. The USB3.1 link bridge 100 has only one upstream port and one downstream port. The USB3.1 link bridge 100 is configured to ignore the route string in the packet header and forward any protocol layer packets from its receiving port to its transmitting port. In some embodiments, when a USB cable that incorporates the USB3.1 link bridge 100 is connected to a host, the USB3.1 link bridge 100 sends a data packet to the USB device connected to the USB cable on the other end and if the USB device sends back NRDY or ERDY packet, the USB3.1 link bridge 100 sends the same packet to the host. Upon receiving ERDY packet, the host may send multiple header and/or data packets without waiting for an acknowledgement. The USB3.1 link bridge 100 transmits the multiple header and/or data packets to the device and sends an LGOOD link command for each header and/or data packet to indicate that the packet successfully reached the next link partner, being the USB device in this case. If the next link partner, being device the USB device in this case fails to acknowledge one or more data packets, the USB3.1 link bridge 100 sends those packets again from the memory. Upon receiving an LGOOD link command for a data packet, the USB3.1 link bridge 100 removes that data packet from its memory.

The LTSSM 170 is coupled to the packet decoder/pattern checker 142 and also a link layer flow control module 180. The link layer flow control module 180 needs to communicate with the LTSSM 170 during various operations. The link layer flow control module 180 signals the LTSSM 170 about the emergence of any link error that must drive the LTSSM 170 into error recovery procedures. The link layer flow control module 180 may also notify the LTSSM 170 about any link power management commands from the host that might need the LTSSM's 170 intervention.

In some embodiments, the state machine of the LTSSM 170 is specified with twelve main states that carry out these responsibilities. Four of these states are solely for power management. These four states are named as U0, U1, U2, and U3. These four states provide different levels of energy saving schemes. U0 being the active most state having all the modules in the device active, while U3 being the most dormant state with maximum power saving facilities, though at a higher latency rate. The U1, and U2 are intermediate power states that provide certain selective levels of power saving. Compared with U1, U2 allows for further power saving opportunities with a penalty of increased exit latency. U3 is a link suspended state where aggressive powers saving opportunities are possible. The USB 3.1 has been designed for maximum power saving, rendering the device completely inactive or "sleeping" when not in use. This enhances up time for portable devices, e.g. laptops, etc.

There are two link training and initialization states namely RX_DETECT and POLLING. The RX_DETECT state is designated for the link's far end receiver detection whereas POLLING is mainly reserved for link training and receiver aligning. RX_DETECT represents the initial power-on link state where a port is attempting to determine if its SuperSpeed link partner is present. POLLING is a link state that is defined for the two link partners to have their SuperSpeed transmitters and receivers trained, synchronized, and ready for packet transfer. The error recovery states are RECOVERY and COMPLIANCE. These states are entered in case of any sort of miss matching of synchronization or malfunctioning. Another state is LOOPBACK which is used as a ping to check the reliability and operation of the receiver and transmitter. Next two states result in case of recovery failure or when the device is disconnected. These states are SS_DISABLED which is entered when device is completely rendered inactive or is disconnected, and the SS_INACTIVE state which is entered when the device cannot operate in "super speed" mode. In the last comes the HOT RESET mode which is entered when the host desires to reset the device.

In some embodiments, after a received packet is found to be fine to be transmitted further to the USB device, an acknowledgement is sent to the host. The packet is stored in a packet First-In-First-Out (FIFO) memory 190A. Similarly, on when the packet is received from the device to be sent to the host, a packet FIFO memory 190B is used. The packet is then transmitted to the device side controller 130B that encodes the packet or packets using a packet encoder/pattern generator 162 and the packet is sent to the USB device after being scrambled using a scrambler 160. The packet encoder/pattern generator 162 may also inserts special symbols in the output data stream (between a plurality of symbols or packets in the output data stream) so that the USB device that may be working on a different clock rate than the host may control and match the clock rate of the host.

The data controller 104 may also include a bridge state machine (BSM) 192. The BSM 192 extends the functionality of the LTSSM 170. The BSM 192 is configured to control further transmission of data packets in that the BSM 192 may decide when to send packets and when to hold on to sending data packets downstream based on the volume of data in the packet FIFO 190A and reception of acknowledge signals from the USB device or another USB3.1 link bridge downstream. The BSM 192 keeps track on the header and/or data packets that are received and stored in the packet FIFO 190A, 190B. When the BSM 192 detects that a header and/or data payload packet has been successfully received and stored in the packet FIFO 190A, 190B, the BSM 192 transmits the received data packet on the opposite port when its link partner (e.g., a USB device) has an empty buffer available to receive this header and/or data payload packet. If a buffer is available at the link partner (e.g., a USB device), the BSM 192 transmits the header and/or data payload packet. If the link partner (e.g., a USB device) returns an LGOOD link command, the USB3.1 link bridge 100 will remove the header and/or data payload packet from the packet FIFO 190A or 190B and inform the link partner at the opposite side (e.g., a USB host) that a buffer has become available and space is available to receive the next header and/or data payload packet. The USB3.1 link bridge 100 has only a single upstream port and a single downstream port. Therefore, the BSM 192 does not need to perform routing as all packets received on one port needs to be transmitted on another port. The embodiments described herein do not require a header router and header aggregator as the USB3.1 link bridge 100 includes only one upstream port and one downstream port.

Figure 3:
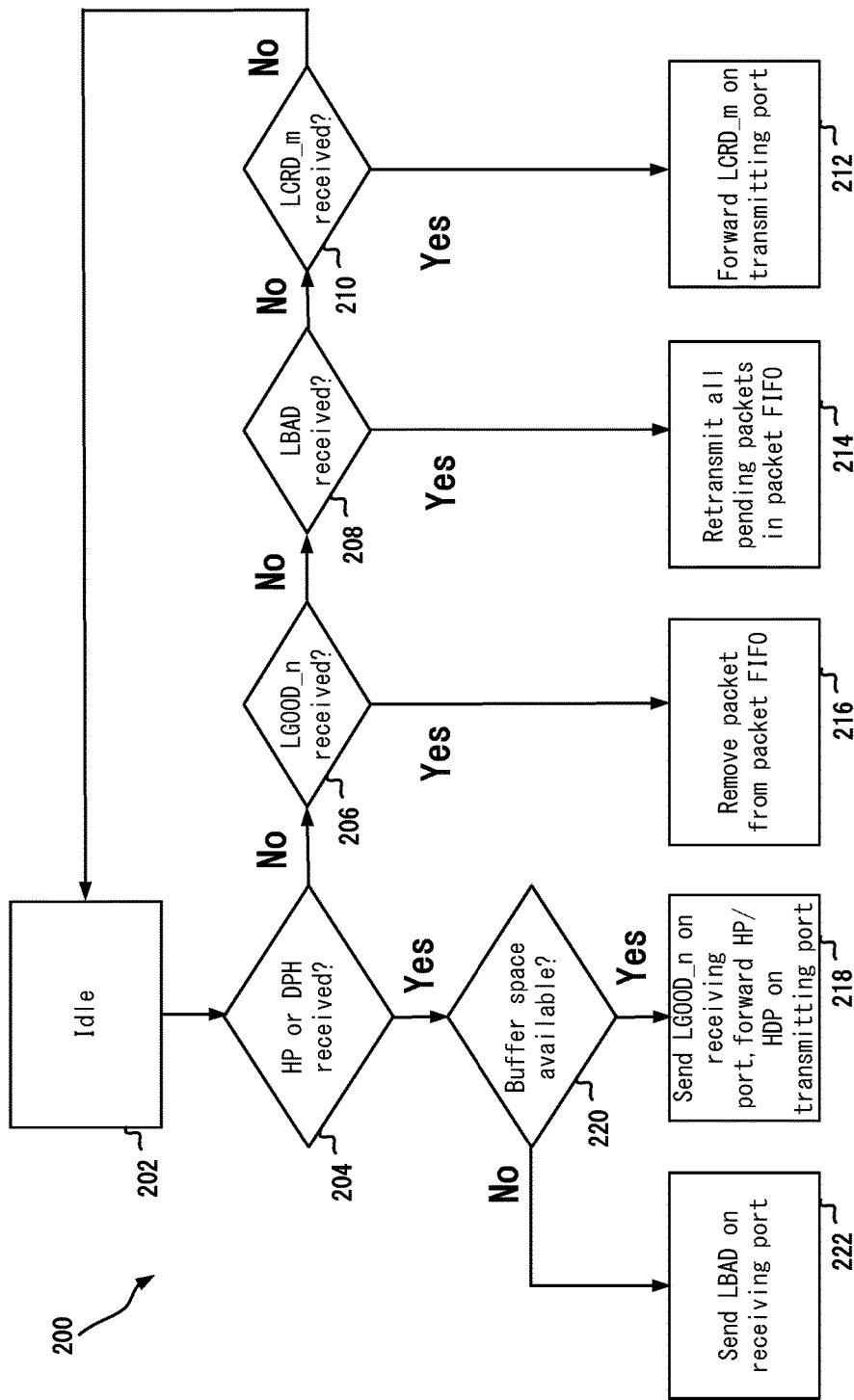
FIG. 3 depicts a flowchart of the operation performed by a bridge state machine in accordance with one or more embodiments.

FIG. 3 depicts a method 200 performed by the BSM 192. At step 202, the BSM 192 stays in idle state waiting an event to occur. At step 204, a header packet (HP) and/or data payload packet (DPH) is received. At step 220, the BSM 192 verifies if the HP or DPH are received without errors and there is buffer space available in the packet FIFO 190A, 190B. If yes, at step 218, the BSM 192 stores the packet and returns an LGOOD_n link command on its receiving port. At the same time when its transmitting port is idle, the BSM 192 forwards the packet on the transmitting port of the USB3.1 link bridge 100. If no buffer space is available, at step 222, the BSM 192 returns an LBAD link command to indicate that something went wrong.

At step 204, if no HP or DPH packet is received, at step 206, If an LGOOD_n link command is received, the BSM 192 removes the corresponding packet from the packet FIFO 190A, 190B. At step 206, if no LGOOD_n command is received, at step 208, the BSM 192 checks if an LBAD link command is received, and if yes, the BSM 192 stops the transmitter and retransmit all pending packets in the packet FIFO 190A, 190B. If no LBAD command is received, at step 210, the BSM 192 checks if an LCRD_m link command is received and if yes, the BSM 192 forwards the LCRD_m link command to the transmitting port to indicate that there is buffer space available to receive the next packet. If no LCRD_m link command is received, the BSM 192 goes to step 202.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A universal serial bus (USB) link bridge integrated circuit (IC) device, comprising:
    a host side module configured to be interfaced with a USB host, wherein the host side module includes a transmitter and a receiver, the receiver configured to receive serial data from the USB host, convert the received serial data into parallel data, and store the parallel data into an elasticity buffer;
    a data controller coupled to the host side module; anda device side module configured to be interfaced with a USB device and coupled to the data controller and including a transmitter and a receiver, wherein the device side module is configured to receive parallel data from the data controller and convert the received parallel data into serial data and to transmit the serial data towards the USB device;
    wherein the data controller is coupled between the host side module and the device side module, wherein, the data controller includes a host-side controller, a device-side controller, a first-in-first-out (FIFO) memory, and a bridge state machine module, the data controller is configured to generate USB link layer link commands, the USB link layer link commands comprising LGOOD_n, LBAD, and LCRD_m USB link layer link commands, and the data controller is configured to receive the parallel data from the host side module, return an acknowledge signal back to the host side module, store the parallel data in the FIFO memory and transmit the parallel data from the FIFO memory based on a configuration of the bridge state machine module, wherein the bridge state machine module is configured to decide when to send the parallel data from the FIFO memory toward the USB device via the device side module, wherein upon receiving the parallel data from the host side module and prior to returning the acknowledge signal back to the USB host via the host side module, the data controller verifies that buffer space in the FIFO memory is available to store the parallel data and if buffer space in the FIFO memory is not available, the bridge state machine module of the data controller is configured to generate and return an LBAD USB link layer link command back to the USB host via the host side module.

2. The USB link bridge device of claim 1, wherein the host-side controller and the device-side controller include separate link training status state machines (LTSSMs) to detect data transmission, polling and synchronization of data transmission, wherein the LTSSMs are separate from the bridge state machine.

3. The USB link bridge device of claim 2, wherein the host-side controller and the device-side controller of the data controller are configured to separately generate link training patterns.

4. The USB link bridge device of claim 1, wherein the bridge state machine module is configured to acknowledge receiving a data packet when buffer space is available in the FIFO memory for storing the received data packet.

5. The USB link bridge device of claim 1, wherein the bridge state machine module is configured to send an LBAD USB link layer link command to the USB host upon receiving a data packet when no buffer space is available in the FIFO memory for storing the received data packet.

6. The USB link bridge device of claim 1, wherein the bridge state machine module is configured to remove a packet from the parallel data stored in the FIFO memory after sending the packet to the USB device and upon receiving an acknowledgement from the USB device.

7. The USB link bridge device of claim 6, wherein bridge state machine module is configured retransmit the packet to the USB device upon receiving an LBAD USB link layer link command from the USB device.

8. The USB link bridge device of claim 1, wherein the bridge state machine module is configured to notify, after receiving a message from the USB device that the USB device is ready to receive more data, the USB host that buffer space is available for more packets.

9. A method for enhancing physical connection distance between a Universal Serial Bus (USB) host and a USB device using a USB link bridge, the method comprising:

receiving, by the USB link bridge, a packet from the USB host;

storing the packet in a first-in-first-out (FIFO) memory of the USB link bridge;

sending, by the USB link bridge, an acknowledgement to the USB host;

transmitting, by the USB link bridge, the packet to the USB device; and receiving, by the USB link bridge, a signal from the USB device, wherein if the signal indicates unsuccessful transmission of the packet, resending the packet and if the signal indicates a successful transmission, removing the packet from the FIFO memory of the USB link bridge and notifying the USB host that another packet can be transmitted from the USB host, wherein upon receiving the packet from the USB host and prior to sending the acknowledge signal back to the USB host, verifying that buffer space is available in the FIFO memory of the USB link bridge to store the packet and if the buffer space is not available, generating and sending an LBAD USB link layer link command back to the USB host.

* * * * *